United States Patent
Ohtomo et al.

(10) Patent No.: US 8,666,571 B2
(45) Date of Patent: Mar. 4, 2014

(54) FLIGHT CONTROL SYSTEM FOR FLYING OBJECT

(75) Inventors: Fumio Ohtomo, Tokyo-to (JP); Hitoshi Otani, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 53 days.

(21) Appl. No.: 13/314,509

(22) Filed: Dec. 8, 2011

(65) Prior Publication Data
US 2012/0173053 A1    Jul. 5, 2012

(30) Foreign Application Priority Data

Jan. 4, 2011 (JP) ................................. 2011-000184

(51) Int. Cl.
*G06F 19/00* (2011.01)
*G08G 5/00* (2006.01)
*B64C 27/00* (2006.01)

(52) U.S. Cl.
USPC ........................... 701/16; 340/948; 244/17.11

(58) Field of Classification Search
USPC .................. 701/15, 16, 3, 14, 20, 400, 23, 2; 348/144; 340/944–980; 244/3.15, 3.16, 244/17.11–17.27
See application file for complete search history.

(56) References Cited

U.S. PATENT DOCUMENTS

| | | |
|---|---|---|
| 4,654,872 A | 3/1987 | Hisano et al. |
| 4,858,157 A | 8/1989 | Murai et al. |
| 5,072,396 A | 12/1991 | Fitzpatrick et al. |
| 5,166,878 A | 11/1992 | Poelstra |
| 5,262,856 A | 11/1993 | Lippman et al. |
| 5,274,453 A | 12/1993 | Maeda |
| 5,490,075 A | 2/1996 | Howard et al. |
| 5,530,420 A | 6/1996 | Tsuchiya et al. |

(Continued)

FOREIGN PATENT DOCUMENTS

| | | |
|---|---|---|
| EP | 1139062 A2 | 10/2001 |
| EP | 1158309 A2 | 11/2001 |

(Continued)

OTHER PUBLICATIONS

European Communication, transmitting Extended European Search Report, dated May 16, 2012 in corresponding European Patent Application No. EP 11195300.6.

(Continued)

*Primary Examiner* — Muhammad Shafi
(74) *Attorney, Agent, or Firm* — Nields, Lemack & Frame, LLC

(57) ABSTRACT

A flight control system for a flying object comprises a flying object, a navigating means provided in the flying object, a position measuring unit 17, a flight control unit 18 for controlling the navigating means, and a main arithmetic control unit 19 for controlling the position measuring unit and the flight control unit, and in the flight control system for a flying object, the position measuring unit has a GPS device 23 for measuring a ground coordinate of the flying object and a vertical camera 13 for taking a digital image below the flying object and measures an altitude of the flying object based on images at two points taken by the vertical camera, on ground coordinates of the two points measured by the GPS device, and on a focal length of the vertical camera, and the main arithmetic control unit controls the navigating means via the flight control unit based on the measured altitude and makes the flying object fly at a predetermined altitude.

6 Claims, 7 Drawing Sheets

(56) References Cited

U.S. PATENT DOCUMENTS

| | | |
|---|---|---|
| 5,559,510 A | 9/1996 | Strong, III et al. |
| 5,684,887 A | 11/1997 | Lee et al. |
| 6,031,568 A | 2/2000 | Wakitani |
| 6,193,190 B1 | 2/2001 | Nance |
| 6,385,334 B1 | 5/2002 | Saneyoshi et al. |
| 6,626,078 B2 | 9/2003 | Thornton |
| 6,690,451 B1 | 2/2004 | Schubert |
| 7,010,401 B1 | 3/2006 | Richburg et al. |
| 7,050,909 B2 | 5/2006 | Nichols et al. |
| 7,242,817 B2 | 7/2007 | Takeda et al. |
| 7,391,340 B2 | 6/2008 | Malhomme |
| 7,552,025 B2 | 6/2009 | Ohtomo et al. |
| 7,755,513 B2 | 7/2010 | Wang et al. |
| 7,804,996 B2 | 9/2010 | Ohtomo et al. |
| 8,019,490 B2 * | 9/2011 | Ferren et al. ............ 701/3 |
| 8,078,349 B1 | 12/2011 | Prada Gomez et al. |
| 2002/0001406 A1 | 1/2002 | Kochi et al. |
| 2002/0180636 A1 | 12/2002 | Lin et al. |
| 2002/0180870 A1 | 12/2002 | Chen |
| 2002/0191837 A1 | 12/2002 | Takeda et al. |
| 2004/0076340 A1 | 4/2004 | Nielsen |
| 2004/0105493 A1 | 6/2004 | Kondo et al. |
| 2004/0105579 A1 | 6/2004 | Ishii et al. |
| 2004/0125984 A1 | 7/2004 | Ito et al. |
| 2005/0084975 A1 | 4/2005 | Armentrout et al. |
| 2005/0125142 A1 * | 6/2005 | Yamane ............ 701/200 |
| 2005/0165517 A1 | 7/2005 | Reich |
| 2006/0138277 A1 | 6/2006 | Franceschini et al. |
| 2007/0081695 A1 | 4/2007 | Foxlin et al. |
| 2008/0071431 A1 | 3/2008 | Dockter et al. |
| 2011/0196598 A1 | 8/2011 | Feyereisen et al. |
| 2011/0307126 A1 | 12/2011 | Hogstrom |
| 2012/0078451 A1 | 3/2012 | Ohtomo et al. |
| 2012/0130566 A1 | 5/2012 | Anderson |
| 2012/0136513 A1 | 5/2012 | Hamburg |
| 2012/0158222 A1 | 6/2012 | Ehlin et al. |
| 2012/0215388 A1 | 8/2012 | Pepitone et al. |
| 2012/0261516 A1 | 10/2012 | Gilliland et al. |
| 2012/0277934 A1 | 11/2012 | Ohtomo et al. |

FOREIGN PATENT DOCUMENTS

| | | |
|---|---|---|
| EP | 1378790 A2 | 1/2004 |
| JP | 5-24589 A | 2/1993 |
| JP | 2662111 B2 | 10/1997 |
| JP | 9-302628 A | 11/1997 |
| JP | 2000-85694 A | 3/2000 |
| JP | 2001-317915 A | 11/2001 |
| JP | 2004-245741 A | 9/2004 |
| JP | 2005-115623 A | 4/2005 |
| JP | 2006-10376 A | 1/2006 |
| JP | 2007-171048 A | 7/2007 |
| JP | 4253239 B2 | 4/2009 |
| JP | 2012-71645 A | 4/2012 |
| KR | 691348 * | 3/2007 |
| WO | 02/082181 A1 | 10/2002 |
| WO | 2004/004320 A1 | 1/2004 |
| WO | 2004/084136 A1 | 9/2004 |

OTHER PUBLICATIONS

Extended European Search Report issued May 23, 2013 in co-pending European Patent Application No. EP 12165456.

Office Action mailed Jun. 20, 2013 in co-pending U.S. Appl. No. 13/238,419.

Office Action mailed Jul. 16, 2013 in co-pending U.S. Appl. No. 13/453,242.

Notice of Allowance mailed Sep. 18, 2013 in co-pending U.S. Appl. No. 13/238,419.

* cited by examiner

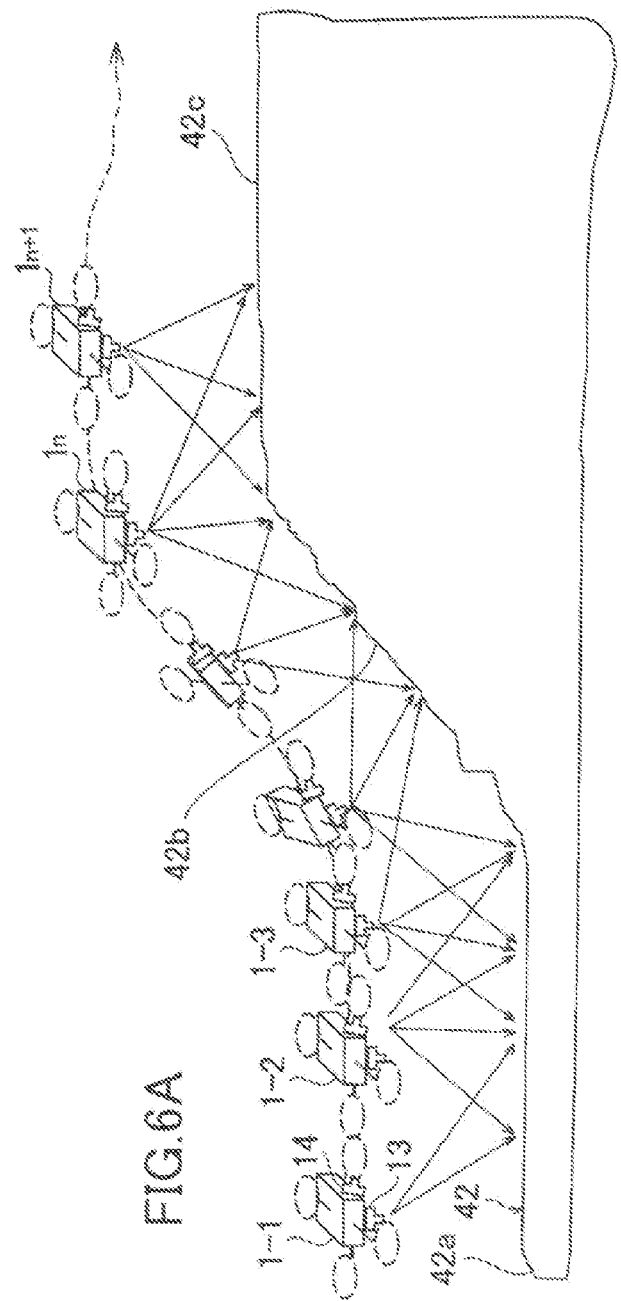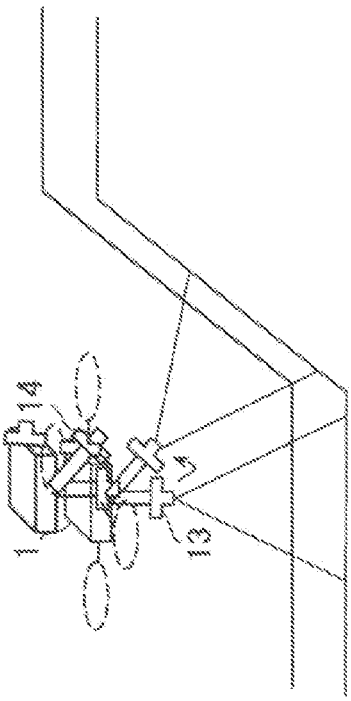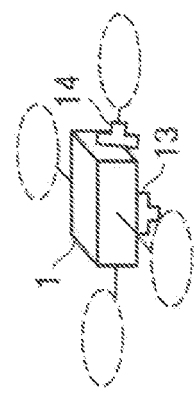

FLIGHT CONTROL SYSTEM FOR FLYING OBJECT

BACKGROUND OF THE INVENTION

The present invention relates to a flight control system for a flying object which appropriately controls a flight altitude during the unmanned flight of the flying object.

In the photography from the air above or the measurement from the air above, the information which cannot be acquired by the photography from the ground or the information which cannot be acquired by the measurement on the ground can be acquired, and the photography is possible in an off-limits area, or the information in an area where measurement is difficult can be acquired. Further, in recent years, an image pickup device can be mounted in a small flying object and the photography can be performed from the air above by a remote operation in an unmanned manner due to the improvement in the performance of the remote controlled small flying object such as a tiny plane or a small-scale helicopter, or the like, the improvement in a remote operation technology, and further, the improvement in the performance of the image pickup device, the acceleration of miniaturization, and others. Furthermore, an autonomous flight can be also performed in accordance with a preset flight schedule.

To make the small flying object fly by a remote operation or fly autonomously, the accurate positional information of the small flying object itself during the flight is required.

As a means for acquiring the positional information, a GPS position measuring instrument has recently spread so that a geocentric coordinate (plane positional information) can be easily measured. Moreover, the reduction in size and weight of the GPS position measuring instrument has advanced, whereby such an instrument can be easily installed in a flying object and others.

Although the GPS position measuring instrument can measure a geocentric coordinate with high accuracy, but its measurement accuracy in regard to a height from a ground surface is poor. An area where the small flying object flies is not necessarily flat, and an altitude of the small flying object must be controlled in accordance with the undulation of the ground surface, the architectural structures, and the building structures when there are the undulation of the ground surface, the architectural structures, and the building structures.

Therefore, to improve an accuracy for the height measurement, another measuring instrument for measuring a height to the ground surface must be additionally prepared. However, an on-board capability of the small flying object is extremely limited to several hundred grams because of the flight ability of the small flying object, and mounting various kinds of measuring devices is difficult.

SUMMARY OF THE INVENTION

It is an object of the present invention to provide a flight control system which can easily measure a height position of a flying object with high accuracy and can appropriately control a flight altitude of the flying object at the time of the unmanned flight.

To obtain the above object, a flight control system for a flying object according to the present invention comprises a flying object, a navigating means provided in the flying object, a position measuring unit, a flight control unit for controlling the navigating means, and a main arithmetic control unit for controlling the position measuring unit and the flight control unit, and in the flight control system for a flying object, the position measuring unit has a GPS device for measuring a ground coordinate of the flying object and a vertical camera for taking a digital image below the flying object and measures an altitude of the flying object based on images at two points taken by the vertical camera, on ground coordinates of the two points measured by the GPS device, and on a focal length of the vertical camera, and the main arithmetic control unit controls the navigating means via the flight control unit based on the measured altitude and makes the flying object fly at a predetermined altitude.

Further, in the flight control system for a flying object according to the present invention, the position measuring unit continuously acquires images from a first point to a second point, extracts feature points from the image acquired at the first point, specifies the feature point of the image at the first point into the image at the second point by an image tracking in the images from the first point to the second point, and carries out the three-dimensional measurement of a measuring point on a ground surface which corresponds to the feature point based on the image at the first point and on the image at the second point.

Further, in the flight control system for a flying object according to the present invention, a flight plan data is set in the main arithmetic control unit, and the main arithmetic control unit controls a flight course and a flight altitude of the flying object based on the flight plan data.

Further, the flight control system for a flying object according to the present invention further comprises a tilting mechanism for tilting the vertical camera, and the tilting mechanism tilts the vertical camera in such a manner that an optical axis of the vertical camera becomes vertical to a tilted plane when the flying object flies above the tilted plane.

Further, the flight control system for a flying object according to the present invention further comprises a foresight camera for acquiring an image of a front side, and the main arithmetic control unit recognizes an obstacle ahead from the image acquired by the foresight camera and avoids the obstacle.

Furthermore, the flight control system for a flying object according to the present invention further comprises a posture detector for detecting a tilting of the flying object, and the posture detector detects the tilting of the flying object at the time of image pickup by the vertical camera, and the position measuring unit carries out the absolute orientation of the image at the first point and the image at the second point based on the tilting of the flying object.

According to the present invention, the flight control system for a flying object comprises a flying object, a navigating means provided in the flying object, a position measuring unit, a flight control unit for controlling the navigating means, and a main arithmetic control unit for controlling the position measuring unit and the flight control unit, and in the flight control system for a flying object, the position measuring unit has a GPS device for measuring a ground coordinate of the flying object and a vertical camera for taking a digital image below the flying object and measures an altitude of the flying object based on images at two points taken by the vertical camera, on ground coordinates of the two points measured by the GPS device, and on a focal length of the vertical camera, and the main arithmetic control unit controls the navigating means via the flight control-unit based on the measured altitude and makes the flying object fly at a predetermined altitude. As a result, the appropriate autonomous flight is possible even in an area having a change in terrain.

Further, according to the present invention, in the flight control system for a flying object, the position measuring unit continuously acquires images from a first point to a second point, extracts feature points from the image acquired at the first point, specifies the feature point of the image at the first point into the image at the second point by an image tracking in the images from the first point to the second point, and carries out the three-dimensional measurement of a measuring point on a ground surface which corresponds to the feature point based on the image at the first point and on the image at the second point. As a result, an image of the ground surface can be appropriately taken, and the three-dimensional data of the ground surface can be also acquired.

Further, according to the present invention, the flight control system for a flying object further comprises a tilting mechanism for tilting the vertical camera, and the tilting mechanism tilts the vertical camera in such a manner that an optical axis of the vertical camera becomes vertical to a tilted plane when the flying object flies above the tilted plane. As a result, a clear image having no projective distortion (projection distortion) can be acquired irrespective of a state of the ground surface.

Further, according to the present invention, the flight control system for a flying object further comprises a foresight camera for acquiring an image of a front side, and the main arithmetic control unit recognizes an obstacle ahead from the image acquired by the foresight camera and avoids the obstacle. As a result, the autonomous flight is possible even in an area having obstacles.

Furthermore, according to the present invention, the flight control system for a flying object further comprises a posture detector for detecting a tilting of the flying object, and the posture detector detects the tilting of the flying object at the time of image pickup by the vertical camera, and the position measuring unit carries out the absolute orientation of the image at the first point and the image at the second point based on the tilting of the flying object. As a result, the highly accurate measurement of an altitude and the three-dimensional measurement of the ground surface are possible even though the flying object tilts at the time of photographing.

BRIEF DESCRIPTION OF THE DRAWINGS

FIG. 6(A) is an explanatory drawing for a situation where the flying object flies while maintaining a predetermined altitude along the ground surface, FIG. 6(B) is an explanatory drawing showing a state of the camera when the flying object has a horizontal posture, and FIG. 6(C) is an explanatory drawing showing a state of the camera with respect to a tilted plane.

DETAILED DESCRIPTION OF THE PREFERRED EMBODIMENTS

Description will be given below on an embodiment of the present invention by referring to the attached drawings.

First, in FIG. 1, description will be given on a basic configuration of a flight altitude control system for a flying object according to the present invention.

Figure 1:
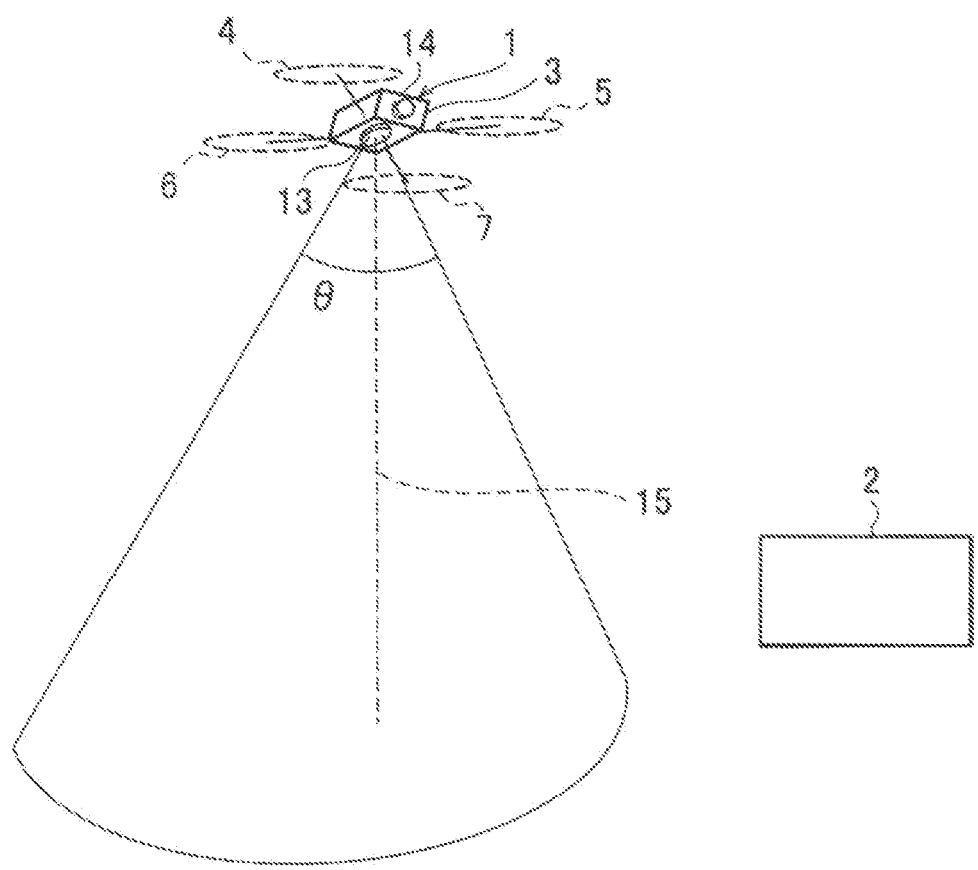
FIG. 1 is a schematical drawing showing a flight altitude control system for a flying object according to the present invention.

In FIG. 1, reference numeral 1 represents a flying object for making an autonomous flight, reference numeral 2 represents a base control device installed on the ground, and the base control device 2 can perform data communication with the flying object 1, controls a flight of the flying object 1, sets or changes a flight plan, and stores or manages information collected by the flying object 1.

The flying object 1 is, e.g., a helicopter as a small flying object for making an autonomous flight. The helicopter 1 is operated by the remote control from the base control device 2, or the flight plan is set in a control device (which will be described later) of the helicopter 1 by the base control device 2, thereby making an autonomous flight in accordance with the flight plan.

The helicopter 1 has a helicopter body 3 and a necessary number of propellers provided to the helicopter body 3, e.g., four propellers, i.e., front, rear, left, and right propellers 4, 5, 6, and 7. The propellers 4, 5, 6, and 7 are individually coupled with a first motor 8, a second motor 9, a third motor 10, and a fourth motor 11 (which will be described later), respectively, and driving of the first motor 8, the second motor 9, the third motor 10, and the fourth motor 11 can be independently controlled as will be described later. It is to be noted that the propellers 4, 5, 6, and 7, the first motor 8, the second motor 9, the third motor 10, and the fourth motor 11, and others constitute a navigating means for the flying object.

An image pickup device and the control device are provided in the helicopter body 3 of the helicopter 1. The image pickup device is constituted of a vertical camera 13 and a foresight camera 14 which acquire digital images. Each of the vertical camera 13 and the foresight camera 14 may be a camera for taking still images at predetermined time intervals or a video camera for continuously taking video images. The vertical camera 13 is provided on a lower surface of the helicopter body 3. Moreover, the image pickup device has a CCD and a CMOS sensor which are aggregations of pixels as image pickup elements, and a position (a coordinate) of each pixel on the image pickup element can be specified and further, a field angle of each pixel can be recognized.

The vertical camera 13 has an optical axis 15 running through a reference position (e.g., the center of a machine) of the helicopter body 3, and the optical axis 15 coincides with a vertical line when the helicopter 1 has a horizontal posture. The vertical camera 13 has a view angle, which is an angle θ and can acquire images for aerial photographs. Additionally, the images taken by the vertical camera 13 are also used as image data for the positional measurement as will be described later.

The vertical camera 13 is preferably supported in such a manner that the optical axis 15 can tilt in a traveling/retreating direction (which will be referred to as a front-back direction hereinafter) with the reference position at the-center, and a tilting mechanism 30 (which will be described later) for tilting the vertical camera 13 in the front-back direction is provided. The tilting mechanism 30 adjusts a tilting of the vertical camera 13 in such a manner that the optical axis 15 is constantly vertical to the ground surface.

Further, the foresight camera 14 is provided on a front surface of the helicopter body 3 to acquire front images, and an optical axis of the foresight camera 14 is horizontal or downwardly tilted at a necessary angle from a horizontal state. Therefore, the foresight camera 14 takes an image of a landscape ahead where the helicopter 1 is flying, and an acquired image is used for a judgment on a change in terrain ahead or for a recognition of obstacles.

The images taken by the vertical camera 13 and the foresight camera 14 are associated with times for taking the images, with geocentric coordinates measured by a GPS device 23 (which will be described later), and with posture states of the helicopter 1 (a tilting of the flying object) detected by a gyro unit 29 (which will be described later) and are stored in a later-described first storage unit 25.

Figure 2:
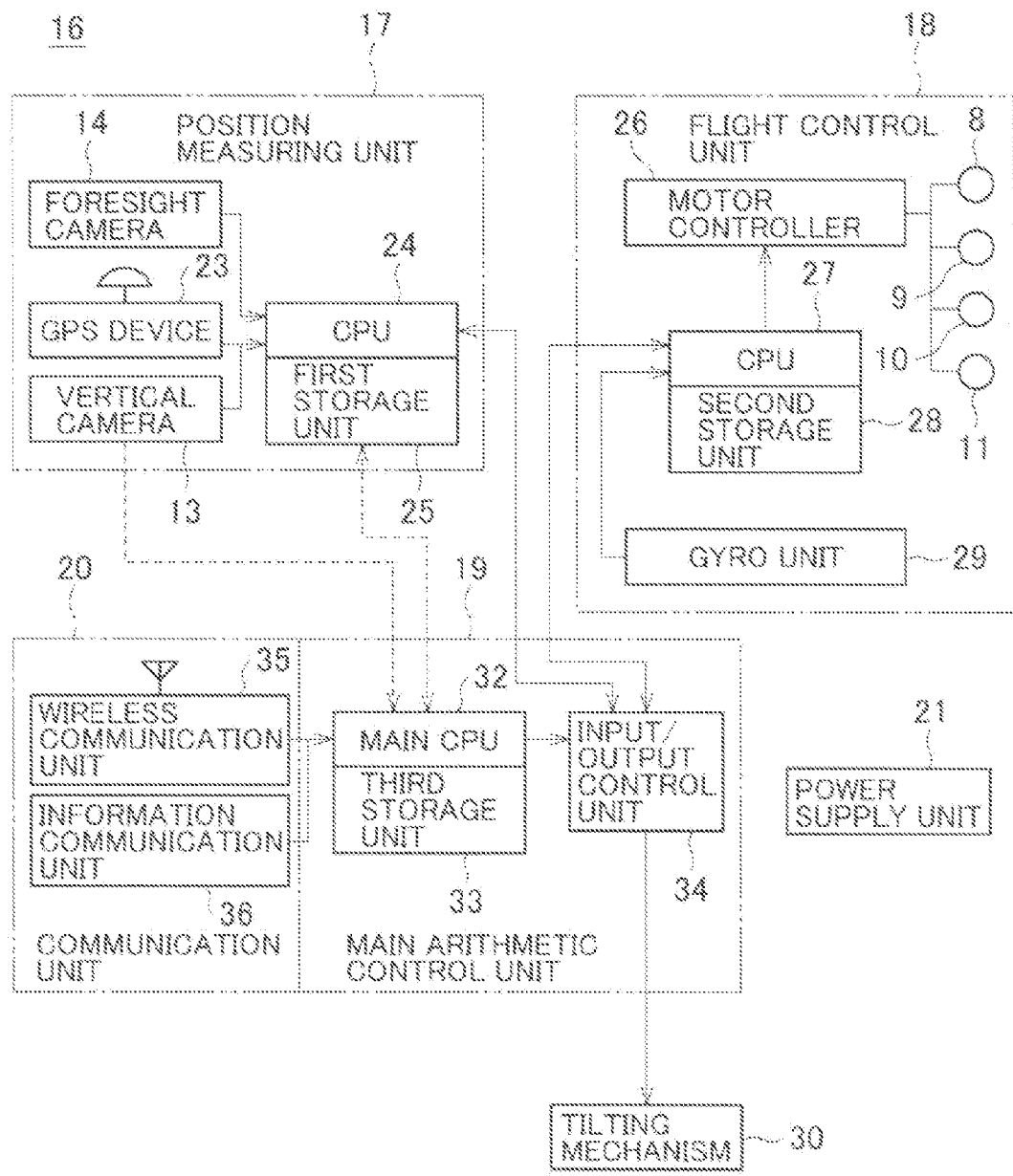
FIG. 2 is a block diagram of a control device mounted in the flying object according to an embodiment of the present invention.

FIG. 2 shows a control device 16 provided in the helicopter body 3. The control device 16 is mainly constituted of a position measuring unit 17, a flight control unit 18, a main arithmetic control unit 19, a communication unit 20, and a power supply unit 21.

The position measuring unit 17 is constituted of the GPS device 23 as a plane position measuring instrument, a position calculating CPU 24, the first storage unit 25, the vertical camera 13, the foresight camera 14, and others.

The GPS device 23 is configured to measure a reference position of the helicopter 1, e.g., the center of a machine, a measurement value of the GPS device 23 represents a ground coordinate system obtained from a geocentric coordinate (absolute coordinate) system, and hence the GPS device 23 measures a coordinate of the reference position in the ground coordinate system.

Furthermore, when the helicopter 1 has a horizontal posture and the vertical camera 13 has a reference posture, the optical axis 15 runs through the reference position and is vertical. Therefore, the vertical camera 13 can acquire an image in a range of the necessary field angle θ immediately below the helicopter 1, and the center of the image is set to coincide with the reference position.

In the first storage unit 25, the image acquired by the vertical camera 13 is stored and a position and a time at which the image was acquired are associated with the image and are stored. Further, the GPS device 23 measures a ground coordinate of the helicopter 1 in synchronization with the time at which the image was acquired, and the measured ground coordinate is also stored in the first storage unit 25 in association with the time at which the image was acquired.

Furthermore, in the first storage unit 25, programs such as an image processing program, a three-dimensional position measuring program, an image pickup control program, and others are stored. Moreover, the images taken by the vertical camera 13 and the foresight camera 14 are stored in the first storage unit 25 in association with times for taking the images, ground coordinates, and posture states of the helicopter 1 (the tilting of the flying object).

The image processing program performs the image processing, e.g., extracting feature points from an image acquired by the vertical camera 13 and other processing and judges a terrain ahead or recognizes obstacles ahead from an image acquired by the foresight camera 14. The three-dimensional position measuring program calculates a height distance of the helicopter 1 based on the feature points extracted from the image of the vertical camera 13 by a measuring method such as a method of intersection or a method of resection or the like. Moreover, the three-dimensional position measuring program obtains a ground coordinate from a measurement result of the GPS device 23 and calculates a three-dimensional position of the helicopter body 3 based on the obtained height distance and ground coordinate. The image pickup control program controls states of image pickup by the vertical camera 13 and the foresight camera 14.

The flight control unit 18 comprises the first motor 8, the second motor 9, the third motor 10, the fourth motor 11, a motor controller 26 for individually driving and controlling these motors, a flight control CPU 27 for controlling the motor controller 26, a second storage unit 28, and a posture detector for detecting a posture state (a tilting) of the helicopter 1 with respect to the horizontal state and generating a posture state signal, e.g., the gyro unit 29.

In the second storage unit 28, a flight control program for calculating flight states such as a flight velocity, an ascending velocity, a descending velocity, a flight direction, a flight altitude, and others based on flight guidance data from the position measuring unit 17, a posture control program for calculating information for posture control based on the posture state signal from the gyro unit 29, and other programs are stored. The flight control CPU 27 transmits a flight control command to the motor controller 26 based on the flight control program, controls the first motor 8, the second motor 9, the third motor 10, and the fourth motor 11 via the motor controller 26, and executes a predetermined flight. The flight control CPU 27 also transmits a posture control command to the motor controller 26 based on the posture control program, controls the first motor 8, the second motor 9, the third motor 10, and the fourth motor 11, respectively via the motor controller 26, thereby controlling a posture of the helicopter 1 to a desired state (e.g., a horizontal state).

The main arithmetic control unit 19 comprises a main CPU 32, a third storage unit 33, and an input/output control unit 34, and the third storage unit 33 stores programs such as an integration program, a flight control program, a surveying image processing program, a communication control program, an image pickup unit posture control program, and others and flight plan data. As the data stored in the flight plan data, there are, e.g., a flight course, a flight altitude, a navigation velocity, a position and a range of image pickup, and others.

The integration program integrates and controls the position measuring unit 17 and the flight control unit 18. The flight control program generates a flight control signal to the flight control unit 18 so that an autonomous flight can be made based on the flight plan data and generates the flight control signal to the flight control unit 18 based on an altitude measurement result from the position measuring unit 17 so that a predetermined altitude can be maintained with respect to the ground surface. Additionally, the flight control program judges a change in terrain ahead or recognizes the obstacles and judges the danger avoidance or the flight course change based on an image from the foresight camera 14. It is to be noted that the flight control program in the second storage unit 28 and the flight control program in the third storage unit 33 have equivalent functions and complement each other.

Further, the image pickup unit posture control program controls the tilting mechanism 30 based on the judgment on a change in terrain and controls a tilting of the vertical camera 13 in such a manner that the optical axis 15 of the vertical camera 13 becomes vertical to the ground surface.

The communication unit 20 is constituted of a wireless communication unit 35, an information communication unit 36, and others, and the wireless communication unit 35 receives a remote flight control command from a ground base and communicates the flight state of the helicopter 1 to the ground base. Furthermore, the information communication unit 36 is configured to transmit/receive the information between the ground base and the helicopter 1 by using a communicating means such as a wireless LAN or the Bluetooth (a registered trademark) or the like, for example, the flight plan data is transmitted from the base to the helicopter 1 in a state that the helicopter 1 has put down in the base, or information of an image, a position, and the time acquired during the flight are transmitted to the base from the helicopter 1.

The power supply unit 21 is, e.g., a rechargeable battery. The power supply unit 21 is charged in a state that the helicopter 1 has put down in the base and the power supply unit 21 supplies necessary power to the navigating means, the position measuring unit 17, the flight control unit 18, the main arithmetic control unit 19, the communication unit 20, and the tilting mechanism 30 during the flight.

An image acquired by the vertical camera 13 and positional information measured by the position measuring unit 17 are communicated to the base control device 2 via the communication unit 20, and the base control device 2 prepares a stereo image from the image or carries out the digital photogrammetry based on the stereo image.

A measurement accuracy of the digital photogrammetry will now be described with reference to FIG. 3.

Figure 3:
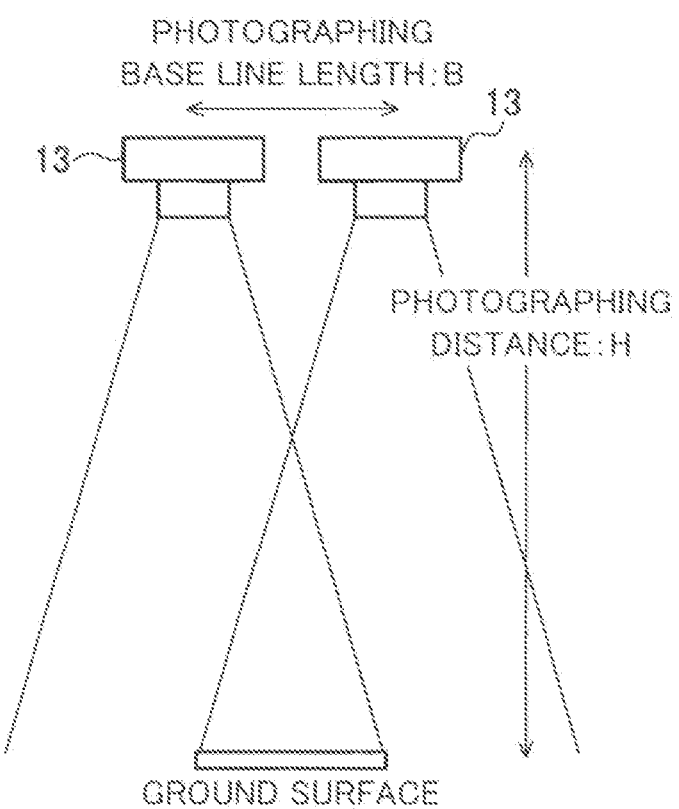
FIG. 3 is an explanatory drawing showing a relationship between a vertical camera mounted in the flying object and a ground surface.

FIG. 3 shows that an image used for the digital photogrammetry is taken with a photographing distance (a height) H, a photographing base line length B, a focal length f of the camera, and a pixel size Δp of the camera and shows a plane accuracy Δxy and a height accuracy Δz under these conditions.

The plane accuracy: $\Delta xy = H \times \Delta p / f$

The height accuracy: $\Delta z = H \times H \times \Delta p / (B \times f)$ is achieved.

Therefore, since the height accuracy Δz is proportional to $H^2$, accurately maintaining the photographing distance H, i.e., accurately maintaining an altitude of the helicopter body 3 at a predetermined value is a requirement for executing the highly accurate digital photogrammetry. Here, the photographing distance H is a height distance calculated in regard to the feature points in the image, and further, the image pickup distance H may be weighted averaging coefficient of the height distances of the feature points or an average of overall three-dimensional coordinates obtained in regard to the image.

As a measuring method for measuring the altitude of the helicopter body 3 to maintain the altitude of the helicopter body 3 at a predetermined value, mounting a laser surveying instrument and controlling a flight altitude of the helicopter body 3 based on an altitude measured by the laser surveying instrument can be considered, but the laser surveying instrument is expensive, and a device configuration of the helicopter body 3 is complicated. Among others, there is a limit due to the on-board capability of the helicopter body 3. In the present embodiment, by using the vertical camera 13, which has been already mounted, the altitude of the helicopter body 3 is measured in real time, and a measurement result is reflected in the flight of the helicopter body 3, and the altitude from the ground surface is to be kept constant.

First, by referring to FIG. 4, description will be given on an outline of distance measurement based on the digital photogrammetry.

Figure 4:
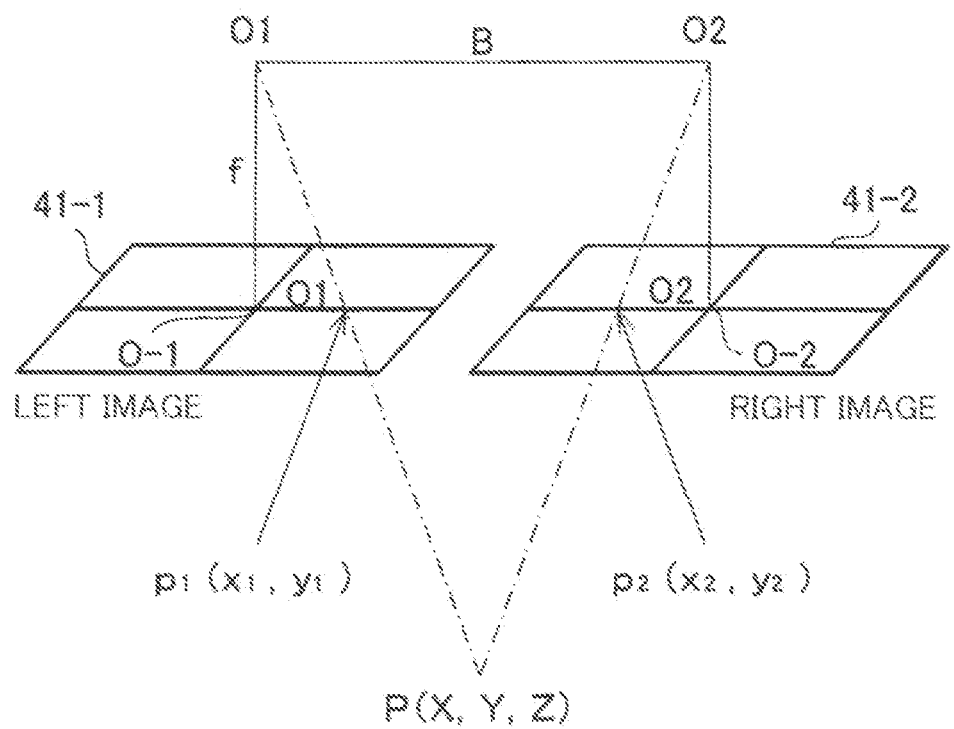
FIG. 4 is an explanatory drawing of a situation where an altitude of the flying object and coordinates of a measuring point are measured from images acquired at two points by the flying object.

FIG. 4 shows a situation that images including a measuring point P are acquired at a known point O1 and a known point O2 by the vertical camera 13, and the point O1 and the point O2 are apart from each other by the photographing base line length B. Further, to simplify the explanation, it is assumed that the optical axes of the vertical camera 13 in the image pickup at the point O1 and the point O2 are parallel to each other. Furthermore, the vertical camera 13 has an image pickup element 41, and reference numerals 41-1 and 41-2 in the drawing represent image pickup elements in a state of image pickup at the point O1 and the point O2, respectively.

A position on the image (i.e., on the image pickup element) of the measuring point P taken at the point O1 is p1 (x1, y1), and a position on the image (i.e., on the image pickup element) of the measuring point P taken at the point O2 is p2 (x2, y2). Assuming that a distance from the center O-1 (an origin) of the image pickup element 41-1 to p1 is l1 and a distance from the center O-2 (an origin) of the image pickup element 41-2 to p2 is l2, a distance Z from the photographing base line length B to P is Z=Bf/(l1+l2) based on a similarity relationship between a triangle O1, O2, P, a triangle O1, O-1, p1, and a triangle O2, O-2, p2.

Here, ground coordinates of the point O1 and the point O2 can be measured by the GPS device 23, and the photographing base line length B is a distance between the two points, i.e., the point O1 and the point O2. The photographing base line length B can be obtained based on a measurement result of the GPS device 23. Further, a geocentric position (a plane coordinate) of the measuring point P can be likewise obtained from p1 (x1, y1) and p2 (x2, y2) and the geocentric position of the point O1 and the point O2 measured by the GPS device 23.

Therefore, an altitude of the helicopter 1 can be measured (height distance measurement) in real time from two images sequentially taken during a process that the helicopter 1 moves.

Figure 5:
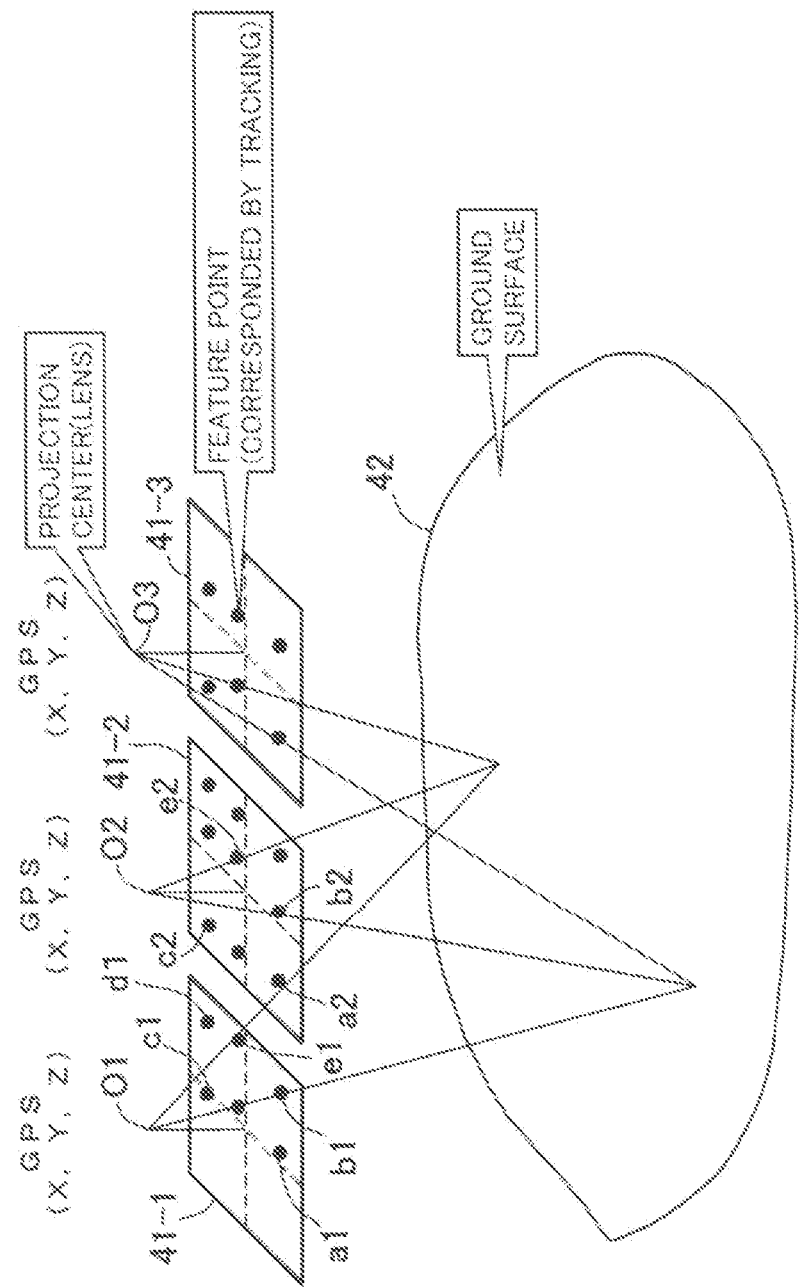
FIG. 5 is an explanatory drawing showing a relationship between the image tracking of feature points extracted from acquired images and non-measured points on the ground surface which correspond to the respective feature points.

FIG. 5 is schematically shows a state that altitude measurement is sequentially performed from image taken by the helicopter 1 in flight. Furthermore, although the altitude measurement of the helicopter 1 has been described with reference to FIG. 4, the height measurement of an arbitrary region in an image, i.e., height measurement of a region of a ground surface 42 which corresponds to a region in the image can be carried out in entire images taken by the vertical camera 13.

Image processing is performed with respect to each image of the ground surface 42 taken by the vertical camera 13, and feature points a to n are extracted from the image. The extraction of the feature points a to n is executed by the appropriate image processing, e.g., the edge processing or the contrast processing and other processing.

Moreover, the feature points extracted from an image at the point O1 must be specified in an image taken at the point O2, there is image tracking as a specifying method. In the image tracking, images are continuously acquired from the point O1 to the point O2, the feature points are sequentially specified (image tracking) in the images adjacent to each other in terms of time, and the feature points in the image at the point O1 are specified in the image at the point O2.

It is to be noted that the image tracking is disclosed in Japanese Patent Application No 2005-37086 (Japanese Patent Application Publication JP-A-2007-171048) filed by the present applicant on ahead.

With respect to the extracted feature points, the measuring method described above is executed in regard to each feature point based on the image at the point O1 and the image at the point O2. A height distance and a plane coordinate of each feature point are likewise obtained. Since the feature points are present in the entire image, a state of the ground surface 42, e.g., irregularities, a tilting, and others can be measured, and hence an aerial photograph having a three-dimensional coordinate can be obtained by associating measurement results with the acquired images.

FIG. 6 shows a situation that the helicopter 1 flies over a position where the ground surface 42 is raised.

The helicopter 1 measures an altitude in real time from images acquired by the vertical camera 13, and the measured altitude is fed back to the main arithmetic control unit 19. The main arithmetic control unit 19 outputs an altitude correction command to the flight control unit 18 so that a distance from the ground surface to the helicopter 1 can be maintained constant from the input altitude, and the flight control unit 18 controls driving of the first motor 8 to the fourth motor 11 through the motor controller 26 in such a manner that the altitude of the flight control unit 18 becomes constant.

Moreover, when the helicopter 1 flying over a low plane 42a reaches a tilted plane 42b (a position 1-3 in FIG. 6(A)), a height distance of the feature point present in a front side region (a right region in FIG. 6(A)) in the image taken by the vertical camera 13 is smaller than a height distance of the feature point in any other region. Therefore, when the height distance of the feature point in the image is partially reduced, it is possible to judge that the helicopter 1 has reached the tilted plane 42b. Additionally, when three or more measuring points are obtained on the tilted plane 42b, the information of a state of a slope, e.g., a tilt angle of the tilted plane 42b can be calculated.

The main arithmetic control unit 19 drives and controls the tilting mechanism 30 based on the calculated tilt angle, and tilts the vertical camera 13 in such a manner that the optical axis 15 becomes vertical to the tilted plane 42b. Whereby, the flight control unit 18 is controlled in such a manner that the height distance has a predetermined value with respect to the tilted plane 42b.

Next, when the helicopter 1 has reached a position near the highest point of the tilted plane 42b (a position 1n in FIG. 6(A)), the height distance of the feature point present in a right region in the image taken by the vertical camera 13 is larger than a height distance of any other regions. It is possible to judge that the helicopter 1 moves from the tilted plane 42b to a high plane 42c based on a change in partial height distance in the image.

It is to be noted that an image of a front side of the helicopter 1 is taken by the foresight camera 14, and it can be judged that the tilted plane is present ahead from a picture acquired by the foresight camera 14. When a tilt angle of the tilted plane is not large, since the tilting can also be likewise judged from the image of the vertical camera 13 as described above, the image acquired by the foresight camera 14 does not have to be reflected in the flight. However, the helicopter 1 may possibly crash against the tilted plane 42b or a building when the tilt angle of the tilted plane 42b is large and the highest point of the tilted plane 42b exceeds a flight altitude or when a building vertically stands. The main arithmetic control unit 19 recognizes an obstacle ahead from the image acquired by the foresight camera 14, issues a command such as a flight course change or the like to the flight control unit 18, and thereby avoids the possibility that the obstacle interferes with or collides with the helicopter 1.

Figure 7:
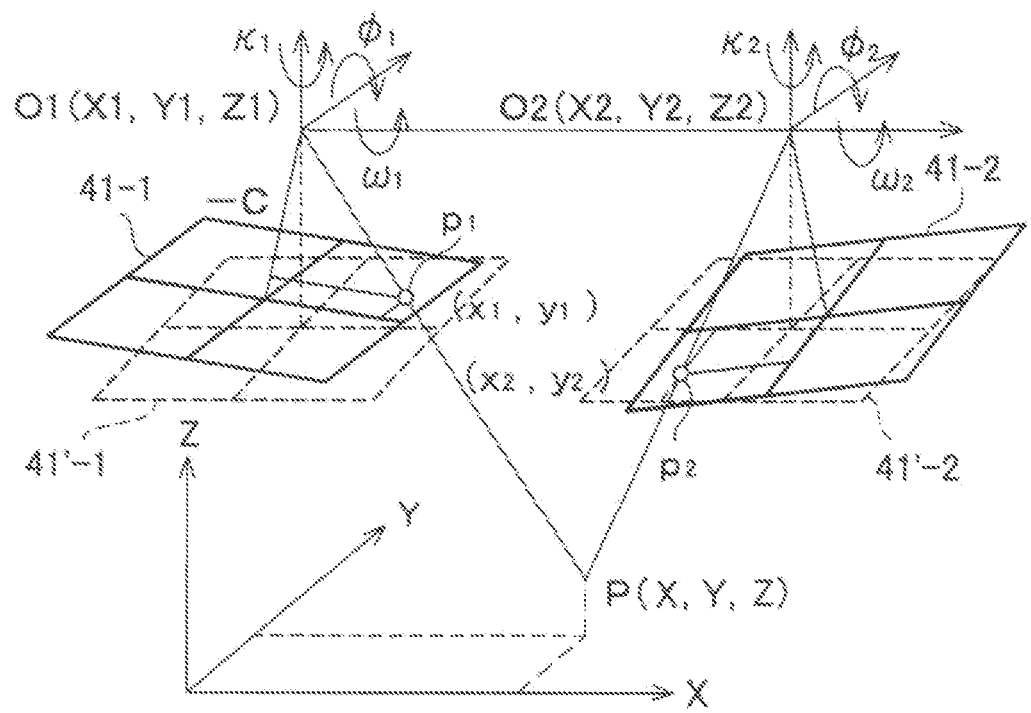
FIG. 7 is an explanatory drawing about the absolute orientation when the camera tilts.

As described above, although the helicopter 1 is horizontally controlled by the flight control unit 18, a posture of the vertical camera 13 which takes the images at the point O1 may be different from a posture of the vertical camera 13 at the point O2 in some cases when the helicopter 1 moves up or down along the tilted plane or when the vertical camera 13 is tilted by the tilting mechanism 30 in such a manner that the optical axis becomes vertical to the tilted plane or other cases. FIG. 7 is a schematic view showing states of tilting in the image taken at the point O1 and the image taken at the point O2. When the vertical (Z axis) of the optical axis 15 is determined as a reference, the tilting of each image is represented by a rotational angle κ with the Z axis as the center, a rotational angle ω with a horizontal first axis (X axis) as the center, and a rotational angle φ with a horizontal second axis (Y axis) as the center. Each image can be converted into a state indicated by a broken line in the drawing (a state shown in FIG. 4) by performing the absolute orientation with respect to the image taken at the point O1 and the image taken at the point O2 while using κ, ω, and φ) as variables. Additionally, when the absolute orientation is performed, a three-dimensional coordinate of the measuring point P can be calculated, and further, altitudes of the helicopter 1 at the point O1 and the point O2 can be measured.

Here, the rotational angles on the three axes at the point O1 and the point O2 can be measured by the gyro unit 29, and a coordinate (x1, y1) of p1 in the image at the point O1 and a coordinate (x2, y2) of p2 in the image at the point O2 can be measured from a position of a pixel of the image pickup element. Therefore, assuming that a coordinate of p1 in a converted coordinate system after the absolute orientation is (X1, Y1, Z1), a coordinate of p2 in the converted coordinate system after the absolute orientation is (X2, Y2, Z2), and the focal length of the vertical camera 13 is f, coordinates of p1 and p2 in the converted coordinate system are represented as follows:

$$X1 = x_1 \cos\phi_1 \cdot \cos\kappa_1 - y_1 \cos\phi_1 \cdot \sin\kappa_1 - f \sin\phi_1$$

$$Y1 = x_1 \sin\kappa_1 = y_1 \cos\kappa_1$$

$$Z1 = x_1 \sin\phi_1 \cdot \cos\kappa_1 - y_1 \sin\phi_1 \cdot \sin\kappa_1 - f \cos\phi_1$$

$$X2 = x_3 \cos\phi_2 \cdot \cos\kappa_3 - y_2 \cos\phi_2 \cdot \sin\kappa_2 - f \sin\phi_1 + 1$$

$$Y2 = x_2(\cos\omega_2 \cdot \sin\kappa_2 + \sin\omega_2 \cdot \sin\phi_2 \cdot \cos\kappa_2) + y_2(\cos\omega_2 \cdot \cos\kappa_2 + \sin\omega_2 \cdot \sin\phi_2 \cdot \sin\kappa_2) + f \sin\omega_2 \cdot \cos\phi_2$$

$$Z2 = x_2(\sin\omega_2 \cdot \sin\kappa_2 + \cos\omega_2 \cdot \sin\phi_2 \cdot \cos\kappa_2) + y_2(\sin\omega_2 \cdot \cos\kappa_2 + \cos\omega_2 \cdot \sin\phi_2 \cdot \sin\kappa_2) - f \cos\omega_2 \cdot \cos\phi_2$$

Therefore, a three-dimensional coordinate of the measuring point P can be calculated based on the obtained-coordinate (X1, Y1, Z1) of p1 and the obtained coordinate (X2, Y2, Z2) of p2 in the same manner as shown in FIG. 4.

It is to be noted that in the embodiment described above, the position measuring unit 17 includes the position calculating CPU 24 and the first storage unit 25 and the image processing and the three-dimensional measurement of the ground surface 42 is performed by the position calculating CPU 24 and the first storage unit 25, but the main CPU 32 and the third storage unit 33 may also function as position calculating CPU 24 and the first storage unit 25. It is to be noted that, when the position calculating CPU 24 and the first storage unit 25 are omitted, the main CPU 32, the third storage unit 33, the GPS device 23, the vertical camera 13, and others constitute the position measuring unit 17.

As described above, according to the present embodiment, the altitude of the helicopter 1 from the ground surface 42 can be measured by the mounted camera alone, and the three-dimensional measurement of the ground surface 42, e.g., irregularities of the ground surface 42 or the like can be also carried out. Therefore, the ground surface 42 can be photographed at an appropriate altitude and appropriate position. An image having the three-dimensional position information can be obtained by associating a result of the three-dimensional measurement of the ground surface 42 with an taken image.

The invention claimed is:
1. A flight control system for a flying object, comprising a flying object, a navigating means provided in said flying object, a position measuring unit, a flight control unit for controlling said navigating means, and a main arithmetic control unit for controlling said position measuring unit and said flight control unit, wherein said position measuring unit has a GPS device for measuring a ground coordinate of said flying object, a vertical camera for taking a digital image below said flying object, and a tilting mechanism for tilting said vertical camera, wherein said tilting mechanism tilts said vertical camera in such a manner that an optical axis of said vertical camera becomes vertical to a tilted plane when said flying object flies above said tilted plane, wherein said vertical camera takes an image from a first point and a ground coordinate of said first point is measured using said GPS device, said flying object then moves from a said first point to a second point, said vertical camera takes an image from said second point and a ground coordinate of said second point is measured using said GPS device, and said main arithmetic control unit measures an altitude of said flying object based on images taken at said first point and said second point, on ground coordinates of said two points, and on a focal length of said vertical camera, and wherein said main arithmetic control unit controls said navigating means via said flight control unit based on said measured altitude and makes said flying object fly at a predetermined altitude.

2. The flight control system for a flying object according to claim 1, wherein said position measuring unit continuously acquires images from a first point to a second point, extracts feature points from said image acquired at said first point, specifies said feature point of said image at said first point into said image at said second point by an image tracking in said images from said first point to said second point, and carries out the three-dimensional measurement of a measuring point on a ground surface which corresponds to said feature point based on said image at said first point and on said image at said second point.

3. The flight control system for a flying object according to claim 1 or claim 2, wherein a flight plan data is set in said main arithmetic control unit, and said main arithmetic control unit controls a flight course and a flight altitude of said flying object based on said flight plan data.

4. The flight control system for a flying object according to claim 3, further comprising a posture detector for detecting a tilting of said flying object, wherein said posture detector detects the tilting of said flying object at the time of image pickup by said vertical camera, and said position measuring unit carries out the absolute orientation of said image at said first point and said image at said second point based on said tilting of said flying object.

5. The flight control system for a flying object according to claim 1, further comprising a foresight camera for acquiring an image of a front side, wherein said main arithmetic control unit recognizes an obstacle ahead from said image acquired by said foresight camera and avoids said obstacle.

6. The flight control system for a flying object according to claim 1 or claim 2, further comprising a posture detector for detecting a tilting of said flying object, wherein said posture detector detects the tilting of said flying object at the time of image pickup by said vertical camera, and said position measuring unit carries out the absolute orientation of said image at said first point and said image at said second point based on said tilting of said flying object.

* * * * *